United States Patent Office 2,792,386
Patented May 14, 1957

2,792,386
WOOD STAIN FILLER COMPOSITION

Carl Berger and Walter S. Hogue, Dayton, Ohio, assignors to The Commonwealth Engineering Company of Ohio, Dayton, Ohio, a corporation of Ohio No Drawing. Application August 4, 1954,
Serial No. 447,915

9 Claims. (Cl. 260—210)

This invention relates to wood stain filler compositions and more particularly to a method of producing a novel wood stain and filler composition utilizing flavanoid triazine compounds.

Stains and the like compositions for filling and coloring wood have been utilized heretofore. These prior stains and wood filling compositions, however, have certain disadvantages and in many cases are not sufficiently fast to light to make them entirely satisfactory. Moreover, many prior art stains or coloring compositions cannot be applied using water which is generally preferred, particularly from an economical standpoint.

It is an object of the present invention to provide a staining composition for application to wood and which is fast to light and easy to apply, and one which is readily dispersible in water.

Another object of the invention is to provide a staining composition for wood which is made from flavanoids such as hesperidin and the like, for example by reacting a flavanoid or mixture thereof with cyanuric chloride in the presence of aluminum chloride and dispersed in carbon disulfide. The resultant reaction product consists of a brown colored substance which is soluble in water and stains wood upon application of the same thereto, and drying.

In accordance with the invention, the wood staining and filling composition is prepared by reacting a flavanoid such as hesperidin or the like with cyanuric chloride, the mixture of ingredients being dissolved in carbon disulfide and refluxed for several hours in the presence of aluminum chloride. The resultant reaction product is then extracted by the use of dioxane to remove excess cyanuric chloride. The remaining residue was then treated with water yielding a dark brown colored layer containing the reaction product of cyanuric chloride and hesperidin. Upon evaporation of the water, a viscous tarry mass was recovered which was soluble in water, and stained wood.

The flavanoid compounds suitable for use in making the wood staining composition are polyhydroxy flavanoids such as hesperidin, hesperidin chalcone, hesperetin, naringin and the like having at least one available hydroxyl group on the outer ring structure, especially in the 3' or 5' position.

Hesperidin which is useful in preparing the wood staining composition has the general structural formula—

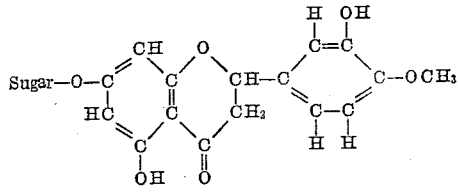

M. P. 261–262° C.

Likewise, hesperidin chalcone, an isomer of hesperidin which has a melting point of 251–252° C. may be used. The general structural formula of this compound is—

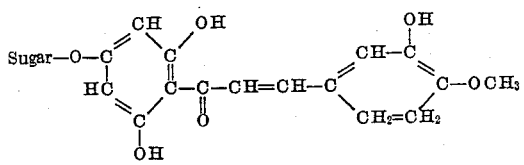

Also hesperetin may be used, and which has the general structural formula—

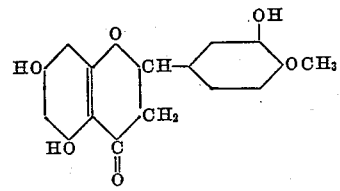

The following examples illustrate the wood staining and filling composition of the invention and how it may be prepared.

Example I

Twelve grams of hesperidin (0.02 mole), 10 grams of cyanuric chloride (0.06 mole), 5 grams of aluminum chloride, and 250 mls. of carbon disulfide were refluxed for 15 hours. The reaction mass was then mixed thoroughly with dioxane to remove excess cyanuric chloride. The remaining solid was treated with water and yielded a dark aqueous solution.

The water layer containing the brown colored staining component was evaporated down to a viscous dark material having the consistency of tar. This material was found to be soluble in water and substantially insoluble in carbon tetrachloride, chloroform, toluene, ethanol, acetone, ethylene glycol and dioxane.

The reaction product of hesperidin and cyanuric chloride produced as described, and forming the brown colored constituent is believed to be a compound having the structural formula as follows—

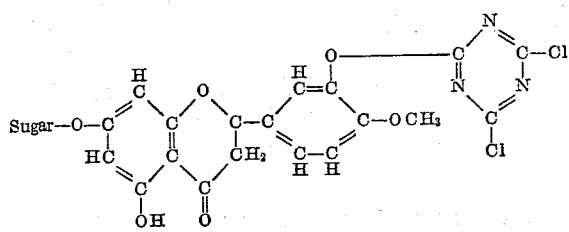

Example II

A wood stain was prepared by dissolving one part by weight of the brown staining composition recovered as in Example I in water, sufficient water being added to form a liquid staining composition. A suitable composition for this purpose may be prepared by stirring in from one to ten parts by weight of the brown colored composition in about one gallon of water.

To this composition may be added suitable fillers such as silex, asbestine, hydrated precipitated calcium silicate, clay or the like, or the composition may be used alone if desired. The filler preferably is incorporated in small amounts, on the order of about 1-8% by weight of the total composition.

The staining composition thus formed may be applied directly to wood surfaces and penetrates the pores and colors the wood to a dark brown hue which upon drying is fast to light and durable under usual weathering conditions.

*Example III*

The reaction mixture was carried out similarly as in Example I, in this instance, but using hesperidin chalcone. The water soluble brown colored reaction product recovered is believed to have the structural formula—

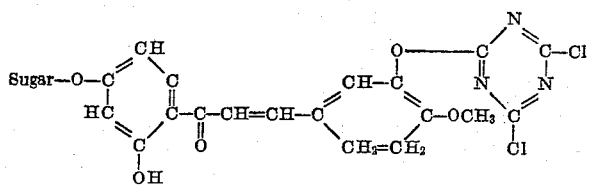

A staining composition may be prepared similarly as in Example II, utilizing the hesperidin chalcone cyanuric reaction product with or without the addition of fillers to provide a suitable staining composition.

*Example IV*

In this example a brown colored staining composition was prepared similarly as in Example I, and utilizing hesperetin as the flavanoid and reacting simple mole concentrations with cyanuric chloride to produce a brown colored staining constituent which is believed to have the structural formula—

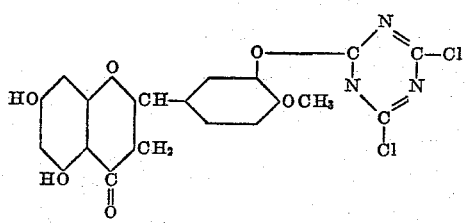

A suitable stain filler composition may be prepared utilizing the resultant brownish colored material as recovered by reacting the flavanoid with cyanuric chloride.

*Example V*

In this example a brown colored staining composition was prepared similarly as in Example I and utilizing naringin as the flavanoid and reacting simple mole concentrations with cyanuric chloride to produce a brown colored staining constituent which is believed to have the structural formula—

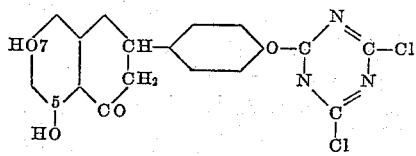

Other suitable solvents may be utilized in compounding the wood stain and filler composition of this invention such as mixtures of water and dioxane and the like in which the coloring stain is miscible. Water is used in the preferred composition because the product is more readily soluble in water than in the mixtures containing organic solvents.

Flavanoid cyanuric chloride staining compositions when applied to wood surfaces and dried stain the same to a soft brown color which has excellent light fastness, the color when tested by exposure to intense ultra-violet light showed no fading tendency when thus exposed overnight.

The flavanoid, as will be noted, is of the polyhydroxy type so that more than one hydroxy is available for substitution. In addition, two or more chlorines are available for reaction in the cyanuric chloride ring so that it is possible to produce a yield containing di- or tri-substituted cyanuric chloride flavanoid coloring compounds useful for staining wood.

It will be understood that while there have been given certain specific examples of the wood staining composition and preferred method of application of the same to wood, it is not intended thereby to specifically limit the invention thereto, the same being adapted to be modified to suit different conditions and uses and without departing from the spirit and scope of this invention, as more particularly pointed out in the appended claims.

What is claimed is:

1. A wood staining and filling composition comprising as a coloring dye for the wood a reaction product of polyhydroxy flavanone with cyanuric chloride, aluminum chloride dissolved in carbon disulfide, said flavanone being selected from the group consisting of naringin, hesperidin, hesperidin chalcone and hesperetin.

2. A wood staining and filling composition comprising as a coloring dye for the wood a reaction product of hesperidin, cyanuric chloride and aluminum chloride, said reaction product being dissolved in solvent to produce a liquid staining composition.

3. A wood staining and filling composition comprising as a coloring dye for the wood a reaction product of hesperidin chalcone, cyanuric chloride and aluminum chloride, said reaction product being dissolved in solvent to produce a liquid staining composition.

4. A wood staining and filling composition comprising as a coloring dye for the wood a reaction product of hesperetin with aluminum chloride and cyanuric chloride, said reaction product being dissolved in solvent to produce a liquid staining composition.

5. A wood staining and filling composition comprising as a coloring dye for the wood a reaction product of a flavanoid selected from the group consisting of hesperidin, hesperidin chalcone, hesperetin and naringin with cyanuric chloride and aluminum chloride.

6. A process of producing a wood staining and filling composition comprising the steps of reacting a polyhydroxy flavanone with cyanuric chloride and aluminum chloride, and dissolving the resultant reaction product in organic solvent to produce a wood staining composition, said flavanone being selected from the group consisting of naringin, hesperidin, hesperidin chlacone and hesperetin.

7. A process of producing a wood staining and filling composition comprising the steps of reacting a mixture of polyhydroxy flavanones with cyanuric chloride and aluminum chloride by refluxing the mixture dissolved in carbon disulfide, and separating the brown colored staining composition therefrom as a water-soluble constituent to form a brown wood staining composition, said polyhydroxy flavanone being selected from the group consisting of naringin, hesperidin, hesperidin chalcone and hesperetin.

8. A process of producing a wood staining and filling composition comprising the steps of reacting polyhydroxy flavanones with cyanuric chloride and aluminum chloride, the mixture being dissolved in carbon disulfide and refluxed for several hours, removing the excess cyanuric chloride by washing the reaction mixture with dioxane, and extracting the brown colored staining composition with water, said polyhydroxy flavanone being selected from the group consisting of naringin, hesperidin, hesperidin chalcone and hesperetin.

9. As a new product, a wood staining and filling composition comprising the reaction product of a polyhydroxy flavanone with cyanuric chloride and aluminum chloride, said reaction product being admixed with an inorganic filler and dispersed in an aqueous vehicle, said polyhydroxy flavanone being selected from the group consisting of naringin, hesperidin, hesperidin chalcone and hesperetin.

References Cited in the file of this patent

UNITED STATES PATENTS

| | | |
|---|---|---|
| 1,551,095 | Fritzsche et al. | Aug. 25, 1925 |
| 1,566,742 | Fritzsche et al. | Dec. 22, 1925 |
| 2,338,149 | Walker et al. | Jan. 4, 1944 |
| 2,632,710 | Mayers | Mar. 24, 1953 |
| 2,748,107 | Hendrickson et al. | May 29, 1956 |

OTHER REFERENCES

Merck Index, pages 814–5 (1952).
Brune: Naturwissenschaften, vol. 41, pages 373–4 (1954).